United States Patent
Kuroki

(12) 
(10) Patent No.: US 10,680,546 B2
(45) Date of Patent: Jun. 9, 2020

(54) MOTOR DRIVE DEVICE INCLUDING POWER STORAGE UNIT, AND MOTOR DRIVE SYSTEM

(71) Applicant: FANUC CORPORATION, Yamanashi (JP)

(72) Inventor: Wataru Kuroki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/234,575

(22) Filed: Dec. 28, 2018

(65) Prior Publication Data

US 2019/0222159 A1 Jul. 18, 2019

(30) Foreign Application Priority Data

Jan. 12, 2018 (JP) .................. 2018-003479

(51) Int. Cl.
| | | |
|---|---|---|
| H02P 27/08 | (2006.01) | |
| H02J 7/04 | (2006.01) | |
| H02J 7/00 | (2006.01) | |
| H02P 5/74 | (2006.01) | |
| H02P 25/22 | (2006.01) | |
| H02M 7/5387 | (2007.01) | |
| H02P 25/022 | (2016.01) | |

(52) U.S. Cl.
CPC .......... *H02P 27/08* (2013.01); *H02J 7/0068* (2013.01); *H02J 7/042* (2013.01); *H02P 5/74* (2013.01); *H02P 25/22* (2013.01); *H02J 7/0048* (2020.01); *H02M 7/53871* (2013.01); *H02P 25/022* (2013.01); *H02P 2201/03* (2013.01)

(58) Field of Classification Search
CPC ................................ H02P 27/08; H02P 25/22
USPC .................................................. 318/504, 494
See application file for complete search history.

(56) References Cited

U.S. PATENT DOCUMENTS 5,710,699 A * 1/1998 King ...................... H02P 23/06
                                                                 363/132
8,928,259 B2 * 1/2015 Kanakasabai ......... H02P 27/14
                                                                 318/376

(Continued)

FOREIGN PATENT DOCUMENTS

| JP | H7-231514 A | 8/1995 |
| JP | H9-149691 A | 6/1997 |

(Continued)

*Primary Examiner* — David Luo
(74) *Attorney, Agent, or Firm* — Hauptman Ham, LLP

(57) ABSTRACT

A motor drive device includes a power conversion unit configured to selectively execute a converter operation of converting AC power into DC power, and an inverter operation of converting DC power into AC power for motor driving, a power storage unit configured to store DC power output from the power conversion unit and also supply DC power to the power conversion unit, a switching unit configured to switch between an AC power supply and a motor a connection destination of the power conversion unit, and a control unit configured to control the switching unit to have the power conversion unit connected to the AC power supply and control the power conversion unit to have the converter operation executed, and configured to control the switching unit to have the power conversion unit connected to the motor and control the power conversion unit to have the inverter operation executed.

12 Claims, 11 Drawing Sheets

(56) References Cited

U.S. PATENT DOCUMENTS 9,148,042 B2 * 9/2015 Chandrasekharan ........................ H02P 29/0241
2017/0349054 A1 12/2017 Yang et al.

FOREIGN PATENT DOCUMENTS

| | | |
|---|---|---|
| JP | H10-80071 A | 3/1998 |
| JP | H11122820 A | 4/1999 |
| JP | 2007-104755 A | 4/2007 |
| JP | 2009136099 A | 6/2009 |
| JP | 2011-250670 A | 12/2011 |
| JP | 2012-55042 A | 3/2012 |
| JP | 2012-105507 A | 5/2012 |
| JP | 2012-228115 A | 11/2012 |
| JP | 2014-176164 A | 9/2014 |
| JP | 2017-17931 A | 1/2017 |
| JP | 2017-221093 A | 12/2017 |
| KR | 10-2012-0125886 A | 11/2012 |

* cited by examiner

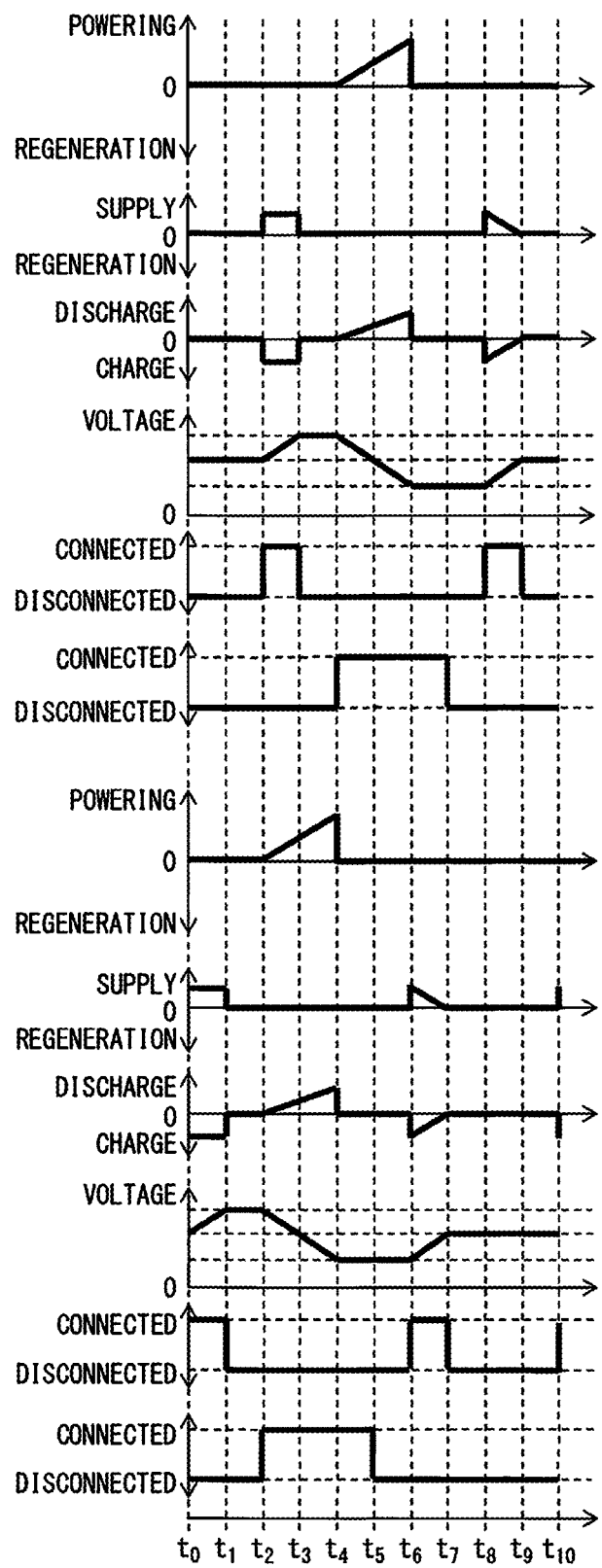

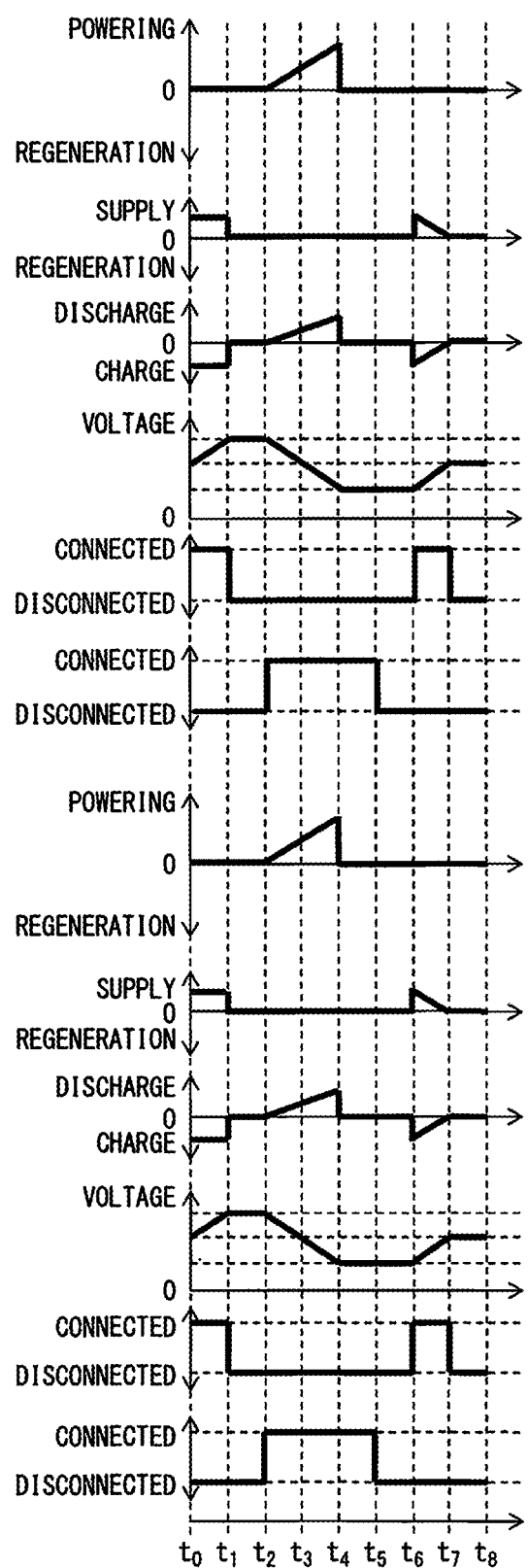

MOTOR DRIVE DEVICE INCLUDING POWER STORAGE UNIT, AND MOTOR DRIVE SYSTEM

RELATED APPLICATIONS

The present application claims priority of Japanese Application Number 2018-003479, filed on Jan. 12, 2018, the disclosure of which is hereby incorporated by reference herein in its entirety.

BACKGROUND OF THE INVENTION

1. Field of Invention

The present invention relates to a motor drive device including a power storage unit, and a motor drive system.

2. Description of the Related Art

In a motor drive device provided to machines including a machine tool, a robot etc., AC power supplied from an AC power supply is converted into DC power by a converter (rectifier) and is output to a DC link, DC power in the DC link is further converted into AC power by an inverter, and the AC power is supplied as drive power to motors provided for respective drive axes.

When a motor is acceleration or deceleration controlled by a motor drive device, a large amount of output or regeneration of AC power is required for an AC power supply in a very short period of time, and therefore a power peak occurs. In a machine almost simultaneously driving a plurality of motors with the same AC power supply, an occurring power peak becomes higher. Further, for example, in a machine such as a press machine or an injection molding machine, a difference between an average power consumption and a maximum instantaneous power consumption is large, that is, a power peak is high. There is a problem that, as a power peak becomes higher, an installation cost of a machine increases due to a larger power supply capacity, and another machine connected to the same AC power supply is affected due to occurrence of a power failure on the AC power supply side, such as a momentary voltage drop or a voltage flicker.

For the purpose of reducing a power supply capacity and not causing a power failure in another machine connected to the same AC power supply, providing a DC link connecting a converter to an inverter in a motor drive device and a power storage unit capable of storing DC power, storing energy taken in from the AC power supply and energy regenerated by a motor into the power storage unit as appropriate, and using the stored energy for driving the motor have been implemented. Supplying much of electric power required for driving the motor from the power storage unit reduces a maximum instantaneous power consumption viewed from the AC power supply side, and therefore a capacity of a power supply facility can be reduced.

For example, as described in Japanese Unexamined Patent Application Publication No. 2017-17931, a motor drive device is known, the device including: a PWM converter performing, by PWM control, power conversion between AC power on an AC power supply side and DC power in a DC link; an inverter converting DC power in the DC link into AC power for motor driving and supplying the AC power to the motor during powering operation, and converting AC power regenerated by the motor into DC power and returning the DC power to the DC link during regenerative operation; a power storage means being provided on the DC link and being capable of storing DC power; a switch connecting/disconnecting an AC power supply to/from the PWM converter in accordance with a received command; and a command means for continuing to output a connection command to the switch while DC voltage on the DC link is boosted until the voltage reaches a specified voltage, the voltage being boosted by DC power converted from AC power by the PWM converter being stored into the power storage means in such a way that AC current taken in from the AC power supply does not exceed a preset input current limit value, and after the DC voltage on the DC link reaches the specified voltage, starting to output a disconnection command to the switch before the inverter starts the powering operation.

Further, for example, as described in Japanese Unexamined Patent Application Publication No. 2014-176164, an on-vehicle charging device equipped on a vehicle converting DC power stored in an on-vehicle battery into AC power by use of a three-phase bridge circuit in a drive inverter and traveling by supplying the converted AC power to a drive motor is known, the device including: a primary coil supplied with AC power from an external power supply; and a secondary coil being electrically connected to the three-phase bridge circuit, transforming voltage of AC power supplied to the primary coil, by being electromagnetically coupled with the primary coil, and charging the on-vehicle battery through the three-phase bridge circuit.

Further, for example, as described in Japanese Unexamined Patent Application Publication No. H10-080071, an electric vehicle charging control device for charging a plurality of electric vehicles by electric power in a late-night power time period is known, the device including: a discharged amount measurement means for measuring a discharged amount of each electric vehicle; a charging time determination means for determining a charging time, based on the discharged amount; and a charging time period setting means for setting a charging time period in such a way that an electric vehicle with the longest charging time out of charging times of electric vehicles determined by the charging time determination means starts charging at a starting time of a late-night power time period, and also an electric vehicle with the shortest charging time ends charging at an ending time of the late-night power time period.

Further, for example, as described in Japanese Unexamined Patent Application Publication No. 2012-105507, a charging method of, with respect to a plurality of objects each including a storage battery, a measurement means of a depth of discharge of the storage battery, and a charging control means for controlling a charging operation on the storage battery, causing one power supply facility to charge each of the storage batteries is known, the method including, by a switching unit: a step of, in a state of a storage battery in each object being chargeably connected to the power supply facility, each of the measurement means detecting a depth of discharge of a storage battery included in the local object; a step of, by referring to a table predetermining a relation between a depth of discharge of a storage battery and a charging start time, each of the charging control means determining a charging start time of the storage battery in a previously allocated chargeable time period; and a step of each of the charging control means starting a charging operation on the storage battery by the power supply facility at a timing of arrival of the charging start time.

SUMMARY OF INVENTION

A capacity of a power supply facility can be further reduced by, in a motor drive device in which a power storage unit is provided on a DC link connecting a converter to an inverter, converting AC power from an AC power supply into DC power by the converter and previously charging the DC power into the power storage unit before driving a motor, electrically detaching the motor drive device from the AC power supply when driving the motor, and covering entire electric power required for driving the motor by AC power converted by the inverter from DC power stored in the power storage unit. However, the converter does not perform a power conversion operation while the motor drive device is electrically detached from the AC power supply and the motor is driven by energy in the power storage unit; and the inverter hardly performs the power conversion operation while the motor drive device is electrically connected to the AC power supply and the power storage unit is charged. In other words, a certain degree of cost reduction by downsizing a power supply facility can be planned by providing the power storage unit; however, the converter and the inverter have low operating rates, respectively, and are not effectively utilized. Such a situation is not viewed preferable since the power conversion unit including the inverter and the converter occupies a particularly large portion of cost and space, among various types of equipment constituting the motor drive device. Accordingly, a small-sized and low-cost motor drive device including a power storage unit provided for reducing a power peak of an AC power supply, and a motor drive system are desired.

According to one aspect of the present disclosure, a motor drive device includes: a power conversion unit including an AC terminal and a DC terminal, and configured to selectively execute a converter operation of converting AC power input through the AC terminal into DC power and outputting the DC power through the DC terminal, and an inverter operation of converting DC power input through the DC terminal into AC power for motor driving and outputting the AC power through the AC terminal; a power storage unit electrically connected through the DC terminal on the power conversion unit, and configured to store DC power output from the power conversion unit and supply DC power to the power conversion unit; a switching unit configured to switch between an AC power supply and a motor an electric connection destination of the AC terminal on the power conversion unit; and a control unit configured to control the switching unit to have the AC terminal on the power conversion unit electrically connected to the AC power supply and also control the power conversion unit to have the converter operation executed to store DC power into the power storage unit, and configured to control the switching unit to have the AC terminal on the power conversion unit electrically connected to the motor and also control the power conversion unit to have the inverter operation executed to drive the motor.

Further, according to one aspect of the present disclosure, a motor drive system includes: the aforementioned motor drive device; and an inverter connected to the power storage unit, and configured to convert DC power stored in the power storage unit into AC power and output the AC power.

Further, according to another aspect of the present disclosure, a motor drive system including a plurality of the aforementioned motor drive devices includes an integrated control unit configured to control an operation of the control unit in each motor drive device in such a way that control of causing the switching unit to electrically connect the AC terminal on the power conversion unit to the AC power supply and also causing the power conversion unit to execute the converter operation is not executed between the respective motor drive devices in a temporally overlapping manner.

BRIEF DESCRIPTION OF THE DRAWINGS

The present invention will be more clearly understood with reference to the following accompanying drawings:

FIG. 10A is a diagram illustrating exemplary waveforms at respective parts in each motor drive device in a case of driving two motors in the motor drive system according to the second embodiment, and particularly illustrates exemplary waveforms at respective parts in a first motor drive device;

FIG. 10B is a diagram illustrating exemplary waveforms at respective parts in each motor drive device in a case of driving two motors in the motor drive system according to the second embodiment, and particularly illustrates exemplary waveforms at respective parts in a second motor drive device;

FIG. 11A is a diagram illustrating exemplary waveforms at respective parts in each motor drive device in a case of driving two motors in two conventional motor drive devices, and particularly illustrates exemplary waveforms at respective parts in a first motor drive device; and FIG. 11B is a diagram illustrating exemplary waveforms at respective parts in each motor drive device in a case of driving two motors in the two conventional motor drive devices, and particularly illustrates exemplary waveforms at respective parts in a second motor drive device.

DETAILED DESCRIPTION

A motor drive device including a power storage unit, and a motor drive system will be described below with reference to drawings. In each drawing, similar components are given similar reference signs. Further, components with a same reference sign in different drawing represent that the components have a same function. Further, the drawings use different scales as appropriate for ease of understanding. A mode illustrated in each drawing is an example for implementing the present invention, and the present invention is not limited to illustrated embodiments.

Figure 1:
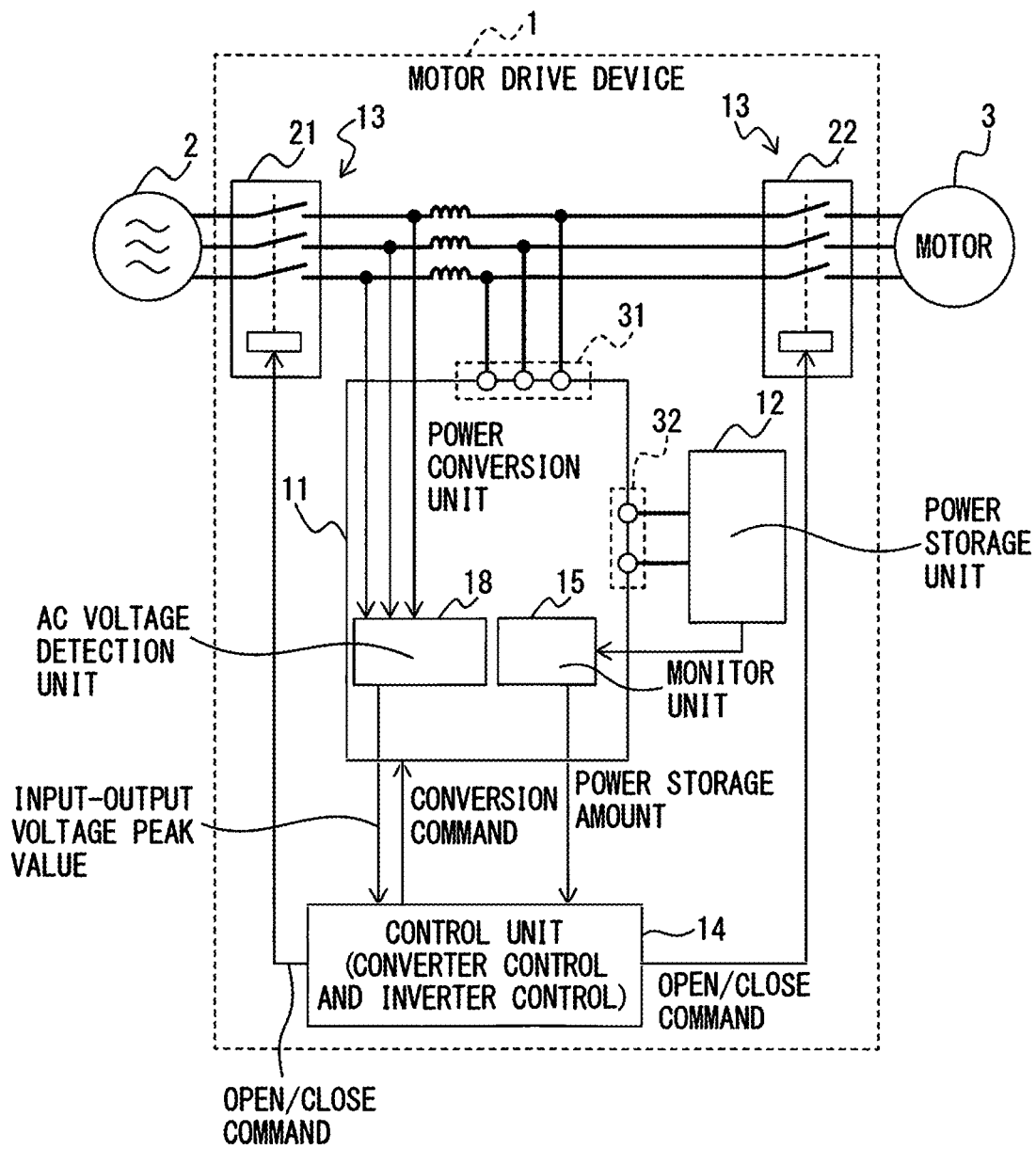
FIG. 1 is a diagram illustrating a motor drive device according to one embodiment of the present disclosure.
Figure 2:
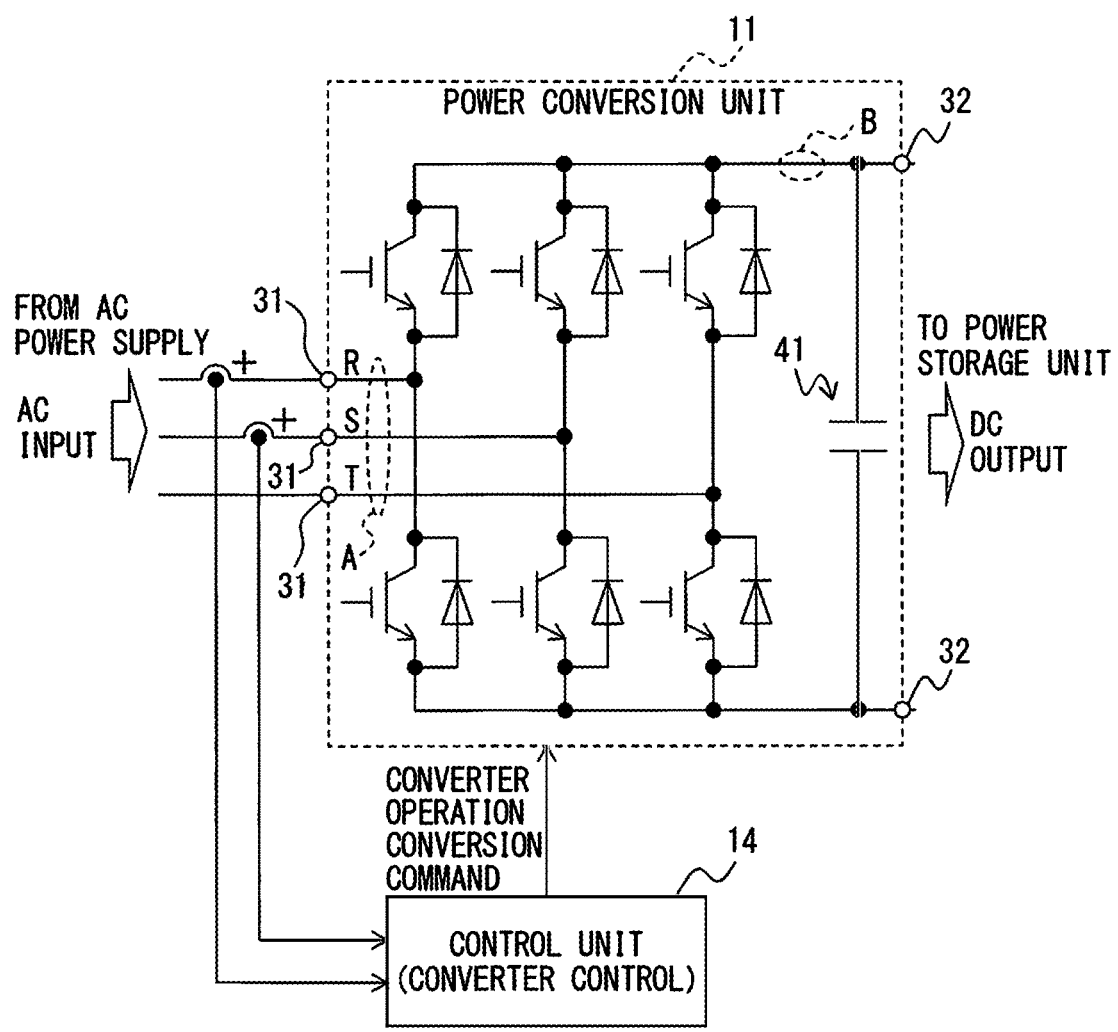
FIG. 2 is a circuit diagram of a power conversion unit provided in the motor drive device according to the embodiment of the present disclosure in a case of the unit performing a converter operation.

FIG. 1 is a diagram illustrating a motor drive device according to one embodiment of the present disclosure. Further, FIG. 2 is a circuit diagram of a power conversion unit provided in the motor drive device according to the embodiment of the present disclosure in a case of the unit performing a converter operation. Further, FIG. 3 is a circuit diagram of the power conversion unit provided in the motor drive device according to the embodiment of the present disclosure in a case of the unit performing an inverter operation.

As an example, a case of controlling one AC motor (hereinafter simply referred to as a "motor") 3 by a motor drive device 1 connected to an AC power supply 2 will be described. An example of the motor 3 to be driven being a single-winding type will be described here, whereas an example of driving a multi-winding-type motor and an example of driving a plurality of motors will be described later. A number of phases of each of the AC power supply 2 and the motor 3 does not particularly limit the present embodiment and may be, for example, three phases or a single phase. An example of the AC power supply 2 and the motor 3 both being three-phase is illustrated in the illustrated example. Further, a type of the motor 3 does not particularly limit the present embodiment either and may be, for example, an induction motor or a synchronous motor. For example, machines provided with the motor 3 include a machine tool, a robot, forming machinery, an injection molding machine, industrial machinery, various types of electric appliances, a train, an automobile, and an aircraft.

As illustrated in FIG. 1, the motor drive device 1 includes a power conversion unit 11, a power storage unit 12, a switching unit 13, and a control unit 14.

Figure 3:
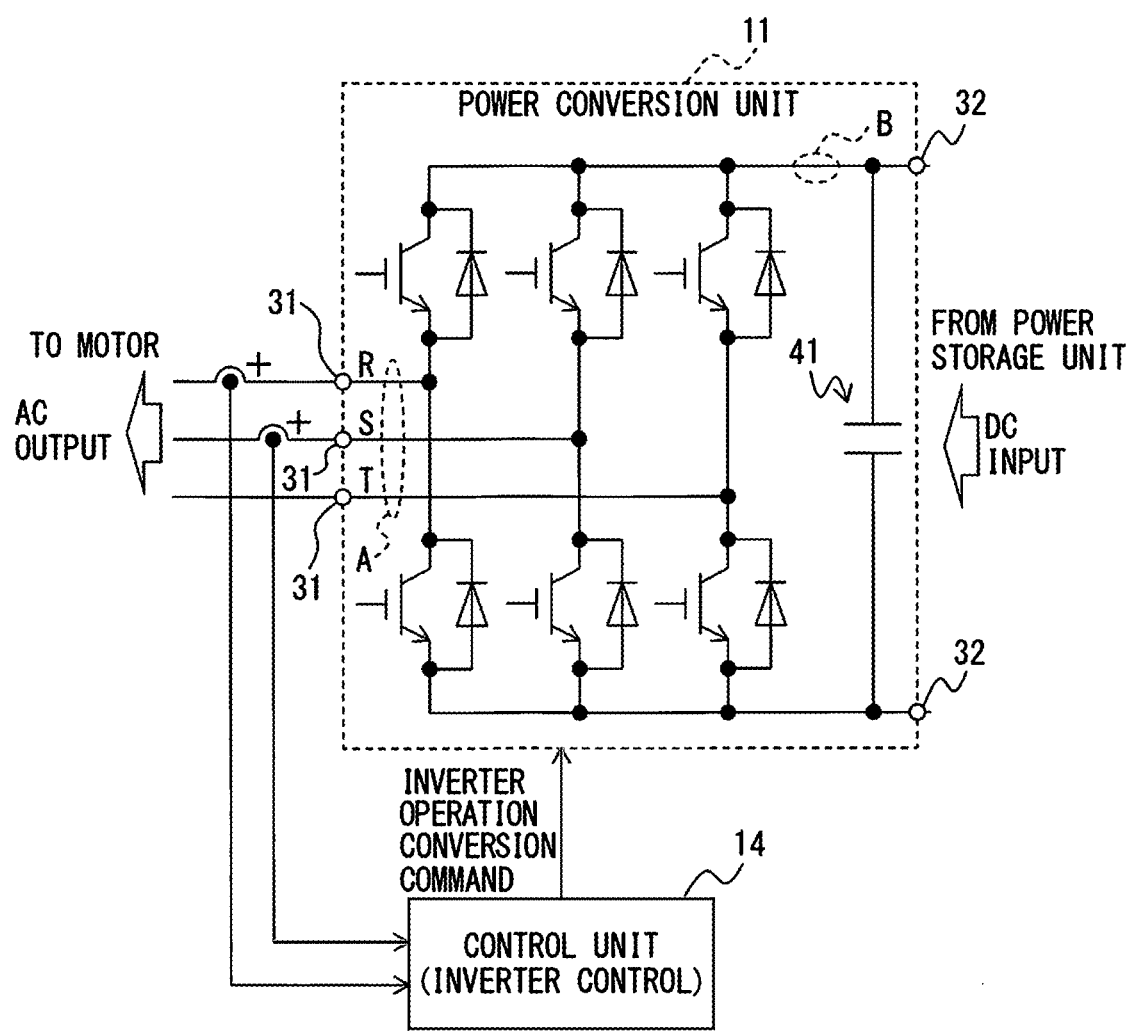
FIG. 3 is a circuit diagram of the power conversion unit provided in the motor drive device according to the embodiment of the present disclosure in a case of the unit performing an inverter operation.

As illustrated in FIGS. 2 and 3, the power conversion unit 11 is composed of a bridge circuit including switching elements and diodes connected in antiparallel with the switching elements. Although examples of the switching element include a unipolar transistor such as an FET, a bipolar transistor, an IGBT, a thyristor, and a GTO, the switching element type itself does not limit the present embodiment and may be another type of switching element. The power conversion unit 11 is composed of a three-phase bridge circuit when the AC power supply 2 and the motor 3 are both three-phase, and is composed of a single-phase bridge circuit when the AC power supply 2 and the motor 3 are both single-phase. Since FIG. 1 illustrates an example of the AC power supply 2 and the motor 3 both being three-phase, the power conversion unit 11 is configured as a three-phase bridge circuit, as illustrated in FIGS. 2 and 3.

An AC terminal 31 is provided on an AC input-output side of the power conversion unit 11, and a DC terminal 32 is provided on a DC input-output side. The AC terminal 31 on the power conversion unit 11 is connected to an AC reactor and the switching unit 13 to be described later. A smoothing capacitor 41 (not illustrated in FIG. 1) is provided between a positive electrode and a negative electrode of the DC terminal 32 on the DC input-output side.

The smoothing capacitor 41 has a function of suppressing a pulsation component in DC voltage in the power conversion unit 11 and also a function of storing DC power. The smoothing capacitor 41 needs to be initially charged in a period from a time immediately after a startup of the motor drive device 1 to a start of driving the motor 3. Accordingly, an initial charging unit (the circuit itself not illustrated) for initially charging the smoothing capacitor 41 is provided at a position A or B illustrated in FIGS. 2 and 3. The initial charging is performed by the initial charging unit including a charging resistor, and a resistor-short-circuiting switch connected in parallel with the charging resistor. The resistor-short-circuiting switch in the initial charging unit is turned off only in an initial charging period of the smoothing capacitor 41, and when voltage across the smoothing capacitor 41 increases to a predetermined voltage and the initial charge is completed, maintains an on-state.

The power conversion unit 11 switches between a converter operation (rectification operation, conversion operation) and an inverter operation (inverse conversion operation), and selectively executes the operations, by each switching element being on-off controlled in response to a conversion command received from the control unit 14. More specifically, when receiving a converter operation conversion command from the control unit 14, the power conversion unit 11 performs the converter operation of converting AC power input through the AC terminal 31 into DC power and outputting the DC power to the power storage unit 12 through the DC terminal 32, as illustrated in FIG. 2. Further, when receiving an inverter operation conversion command from the control unit 14, the power conversion unit 11 executes the inverter operation of converting DC power input from the power storage unit 12 through the DC terminal 32 into AC power for motor driving and outputting the AC power through the AC terminal 31, as illustrated in FIG. 3. Thus, in the power conversion unit 11, a single bridge circuit operates as a converter or an inverter depending on a conversion command received from the control unit 14. For example, a PWM switching control system is cited as a control system of the power conversion unit 11.

The power storage unit 12 is electrically connected through the DC terminal 32 on the power conversion unit 11, and stores DC power output from the power conversion unit 11 and also supplies DC power to the power conversion unit 11. Types of the power storage unit 12 include a capacitor type and a flywheel type.

For example, when the power storage unit 12 is configured as a capacitor type, the power storage unit 12 is composed of a large-capacity capacitor.

Further, for example, when the power storage unit 12 is configured as a flywheel type, a flywheel, a buffer motor, and a buffer power conversion unit (none illustrated) constitute the power storage unit 12. The flywheel can store rotational energy and is also referred to as an inertia. The buffer motor is for rotating the flywheel, and the flywheel is connected to a rotation axis of the buffer motor. Rotational energy can be stored in the flywheel by causing the buffer motor to run. The buffer power conversion unit performs power conversion between DC power, and AC drive power and AC regenerated power of the buffer motor. By the power conversion by the buffer power conversion unit being controlled, the buffer motor connected to the flywheel runs in an accelerated or decelerated manner, or at a constant speed, and consequently, DC electric energy to be stored or fed by the power storage unit 12 is adjusted.

The switching unit 13 switches between the AC power supply 2 and the motor 3 an electric connection destination of the AC terminal 31 on the power conversion unit 11, in accordance with control by the control unit 14. More specifically, the switching unit 13 includes a first open-close unit 21 opening and closing an electric circuit between the AC terminal 31 on the power conversion unit 11 and the AC power supply 2, and a second open-close unit 22 opening and closing an electric circuit between the AC terminal 31 on the power conversion unit 11 and the motor 3. An electromagnetic contactor and a power semiconductor switching element are cited as examples of the first open-close unit 21 and the second open-close unit 22. As will be described in detail later, a contact point on the first open-close unit 21 is closed and also a contact point on the second open-close unit 22 is opened in a case of storing DC power into the power storage unit 12, and the contact point on the first open-close unit 21 is opened and also the contact point on the second open-close unit 22 is closed in a case of driving the motor 3, in accordance with control by the control unit 14. In other words, AC current flows through the first open-close unit 21 in an on-state in the case of storing DC power into the power storage unit 12, and AC current flows through the second open-close unit 22 in an on-state in the case of driving the motor 3. By causing the power storage unit 12 to store power slowly, AC current flowing through the first open-close unit 21 in the case of storing power can be made smaller than AC current flowing through the second open-close unit 22 in the case of driving the motor 3, and therefore the first open-close unit 21 can be further downsized compared with the second open-close unit 22.

A monitoring unit 15 monitors a power storage amount of the power storage unit 12. In the illustrated example, the monitoring unit 15 is provided inside the power conversion unit 11 but may be provided outside the power conversion unit 11. The power storage amount of the power storage unit 12 monitored by the monitoring unit 15 is sent to the control unit 14.

When the power storage unit 12 is a flywheel type, the monitoring unit 15 calculates a power storage amount of the power storage unit 12, for example, in accordance with Equation 1 below. A rotational speed (angular speed) of a buffer motor is denoted as ω, and a moment of inertia of the buffer motor is denoted as J in Equation 1. The rotational speed w of the buffer motor is detected by a speed detection unit (unillustrated).

$$\text{Power storage amount of flywheel-type power storage unit } 12 = (\tfrac{1}{2}) \times J \times \omega^2 \quad (1)$$

As can be understood from Equation 1, a power storage amount of the flywheel-type power storage unit 12 is proportional to a square of the rotational speed of the buffer motor, and therefore calculation processing using Equation 1 may be omitted, and the rotational speed w (or a square thereof) of the buffer motor may be used as a parameter indicating the power storage amount of the power storage unit 12.

When the power storage unit 12 is a capacitor type, the monitoring unit 15 calculates a power storage amount of the power storage unit 12, for example, in accordance with Equation 2 below. Capacitance of the power storage unit 12 is denoted as C, and capacitor voltage of the power storage unit 12 is denoted as V in Equation 2. The capacitor voltage V of the power storage unit 12 is detected by a capacitor voltage detection unit (unillustrated).

$$\text{Power storage amount of capacitor-type power storage unit } 12 = (\tfrac{1}{2}) \times C \times V^2 \quad (2)$$

As can be understood from Equation 2, the power storage amount of the capacitor-type power storage unit 12 is proportional to a square of the capacitor voltage of the power storage unit 12, and therefore calculation processing using Equation 2 may be omitted, and the capacitor voltage V (or a square thereof) of the power storage unit 12 may be used as a parameter indicating the power storage amount of the power storage unit 12.

An AC voltage detection unit 18 detects a peak value of an input-output voltage (that is, a phase voltage of an AC power line between the first open-close unit 21 and the second open-close unit 22) at the AC terminal 31 in the power conversion unit 11 (hereinafter referred to as "input-output voltage peak value"). The input-output voltage peak value detected by the AC voltage detection unit 18 is sent to the control unit 14.

The control unit 14 controls the power conversion operation by the power conversion unit 11 and the switching operation by the switching unit 13, by use of a power storage amount of the power storage unit 12 monitored by the monitoring unit 15 and an input-output voltage peak value detected by the AC voltage detection unit 18. Specifically, the control unit 14 controls the switching unit 13 to have the AC terminal 31 on the power conversion unit 11 electrically connected to the AC power supply 2 and also controls the power conversion unit 11 to have the converter operation executed in order to store DC power into the power storage unit 12, and controls the switching unit 13 to have the AC terminal 31 on the power conversion unit 11 electrically connected to the motor 3 and also controls the power conversion unit 11 to have the inverter operation executed in order to drives the motor 3.

When storing DC power into the power storage unit 12, the control unit 14 performs control of outputting open/close commands to the switching unit 13 in order to have the AC terminal 31 on the power conversion unit 11 electrically connected to the AC power supply 2, and control of causing the power conversion unit 11 to execute the converter operation. Specifically, when storing DC power into the power storage unit 12, the control unit 14 transmits a close command to the first open-close unit 21 in order to have a contact point on the first open-close unit 21 closed and also transmits an open command to the second open-close unit 22 in order to have a contact point on the second open-close unit 22 opened. Consequently, the motor drive device 1 enters a state of being electrically connected to the AC power supply 2 but electrically detached from the motor 3. At this time, the control unit 14 performs control of transmitting a converter operation conversion command to the power conversion unit 11 and causing the power conversion unit 11 to execute the converter operation. Consequently, AC power from the AC power supply 2 is input to the power conversion unit 11 through the first open-close unit 21 and the AC terminal 31, and the power conversion unit 11 converts the AC power into DC power and outputs the DC power to the power storage unit 12 through the DC terminal 32. Consequently, the power storage unit 12 is charged.

On the other hand, when driving the motor 3, the control unit 14 performs control of outputting open/close commands to the switching unit 13 in order to have the AC terminal 31 on the power conversion unit 11 electrically connected to the motor 3, and control of causing the power conversion unit 11 to execute the inverter operation. Specifically, when driving the motor 3, the control unit 14 outputs an open command to the first open-close unit 21 in order to have the contact point on the first open-close unit 21 opened and also outputs a close command to the second open-close unit 22 in order to have the contact point on the second open-close unit 22 closed. Consequently, the motor drive device 1 enters a state of being electrically connected to the motor 3 but electrically detached from the AC power supply 2. At this time, the control unit 14 performs control of transmitting an inverter operation conversion command to the power conversion unit 11 and causing the power conversion unit 11 to execute the inverter operation. Consequently, DC power from the power storage unit 12 is input to the power conversion unit 11 through the DC terminal 32, and the power conversion unit 11 converts the DC power into AC power and outputs the AC power to the motor 3 through the AC terminal 31. Consequently the motor 3 is driven.

Thus, in a case of storing DC power into the power storage unit 12, the power conversion unit 11 operates as a converter in a state of being electrically connected to the AC power supply 2 and detached from the motor 3. Further, in a case of driving the motor 3, the power conversion unit 11 operates as an inverter in a state of being detached from the AC power supply 2 and electrically connected to the motor 3. Accordingly, the AC terminal 31 and the DC terminal 32 on the power conversion unit 11 are shared between the case of storing DC power into the power storage unit 12 and the case of driving the motor 3.

In the motor drive device 1, switching between storing power into the power storage unit 12 and driving the motor 3 is controlled by the control unit 14 in accordance with, for example, a power storage amount of the power storage unit 12 monitored by the monitoring unit 15, and an operation program of the motor 3. When charging the power storage unit 12, the control unit 14 performs control of causing the switching unit 13 to electrically connect the AC terminal 31 on the power conversion unit 11 to the AC power supply 2 and also causing the power conversion unit 11 to execute the converter operation, until the monitoring unit 15 determines that the power storage amount of the power storage unit 12 has reached a previously specified upper limit. Subsequently, when the monitoring unit 15 determines that the power storage amount of the power storage unit 12 has reached the upper limit as a result of storage of DC power into the power storage unit 12, the control unit 14 performs control of causing the switching unit 13 to electrically connect the AC terminal 31 on the power conversion unit 11 to the motor 3 and also causing the power conversion unit 11 to execute the inverter operation. Subsequently, when the monitoring unit 15 determines that the power storage amount of the power storage unit 12 has fallen below a previously specified lower limit as a result of driving the motor 3, the control unit 14 performs control of causing the switching unit 13 to electrically connect the AC terminal 31 on the power conversion unit 11 to the AC power supply 2 and also causing the power conversion unit 11 to execute the converter operation. The aforementioned "lower limit" used in monitoring processing by the monitoring unit 15 may be set to a minimum value required for driving the motor 3 when the motor drive device 1 is detached from the AC power supply 2 and AC power is not supplied from the AC power supply 2, and is preferably set to a value greater than the minimum value in order to allow for some margin. Further, the aforementioned "upper limit" used in the monitoring processing by the monitoring unit 15 may be set to a value greater than the aforementioned "lower limit" and less than the maximum power storage capacity of the power storage unit 12. As a difference between the upper limit and the lower limit becomes greater, a greater power storage amount can be stored in the power storage unit 12. The upper limit and the lower limit are specified by an energy amount when the power storage amount of the power storage unit 12 is expressed by an energy amount as expressed in Equation 1 or Equation 2, by a rotational speed w (or a square thereof) of the buffer motor when the power storage unit 12 is a flywheel type and the power storage amount thereof is expressed by a rotational speed w (or a square thereof), and by a voltage value (or a square thereof) when the power storage unit 12 is a capacitor type and the power storage amount thereof is expressed by a capacitor voltage V (or a square thereof).

Figure 4:
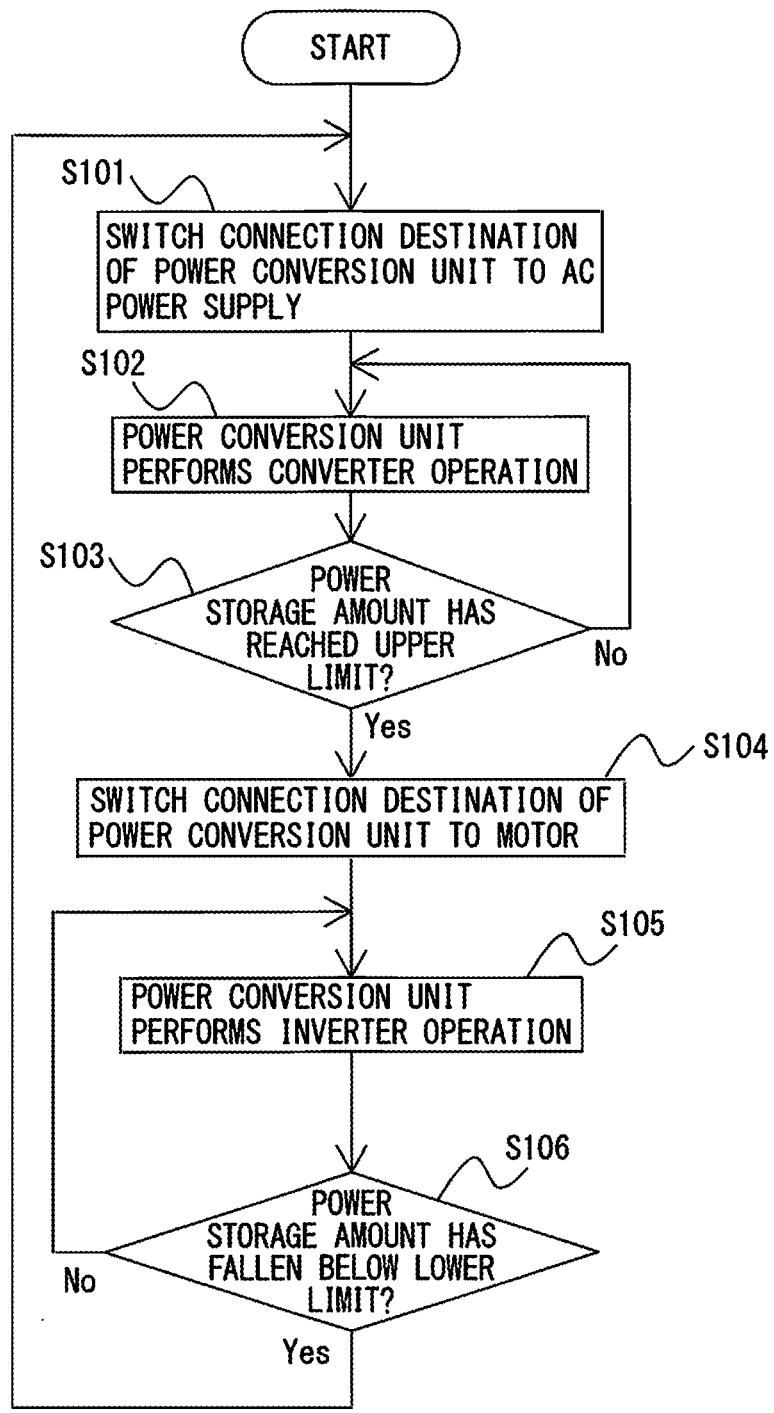
FIG. 4 is a flowchart illustrating an operation flow of the motor drive device according to the embodiment of the present disclosure.

FIG. 4 is a flowchart illustrating an operation flow of the motor drive device according to the embodiment of the present disclosure.

In order to store energy for driving the motor 3 into the power storage unit 12, first, in Step S101, the control unit 14 transmits a close command to the first open-close unit 21 in order to have the contact point on the first open-close unit 21 closed and also transmits an open command to the second open-close unit 22 in order to have the contact point on the second open-close unit 22 opened. Consequently, the power conversion unit 11 enters a state of being electrically connected to the AC power supply 2 but electrically detached from the motor 3.

In Step S102, the control unit 14 performs control of transmitting a converter operation conversion command to the power conversion unit 11 and causing the power conversion unit 11 to execute the converter operation. Consequently, AC power from the AC power supply 2 is input to the power conversion unit 11 through the first open-close unit 21 and the AC terminal 31, and the power conversion unit 11 converts the AC power into DC power and outputs the DC power to the power storage unit 12 through the DC terminal 32. The power storage unit 12 is charged by the DC power, and a power storage amount of the power storage unit 12 gradually increases.

In Step S103, the monitoring unit 15 determines whether or not the power storage amount of the power storage unit 12 has reached a previously specified upper limit. When determining that the power storage amount of the power storage unit 12 has reached the upper limit, the monitoring unit 15 advances to Step S104 and returns to Step S102 otherwise.

In Step S104, the control unit 14 outputs an open command to the first open-close unit 21 in order to have the contact point on the first open-close unit 21 opened, and also outputs a close command to the second open-close unit 22 in order to have the contact point on the second open-close unit 22 closed. Consequently, the power conversion unit 11 enters a state of being electrically connected to the motor 3 but electrically detached from the AC power supply 2.

In Step S105, the control unit 14 performs control of transmitting an inverter operation conversion command to the power conversion unit 11 and causing the power conversion unit 11 to execute the inverter operation. Consequently, DC power from the power storage unit 12 is input to the power conversion unit 11 through the DC terminal 32, and the power conversion unit 11 converts the DC power into AC power and outputs the AC power to the motor 3 through the AC terminal 31. The motor 3 is driven by the AC power; and DC power stored in the power storage unit 12 is consumed, and the power storage amount gradually decreases. Although the inverter operation by the power conversion unit 11 in Step S105 may be started immediately after the power conversion unit 11 enters the state of being electrically connected to the motor 3 and electrically detached from the AC power supply 2 by the processing in Step S104, the inverter operation by the power conversion unit 11 may be started at a timing specified in the operation program of the motor 3. In this case, a period from a time point when the power conversion unit 11 enters the state of being electrically connected to the motor 3 and electrically detached from the AC power supply 2 by the processing in Step S104 to a time point when supply of AC power to the motor 3 by the inverter operation of the power conversion unit 11 is started in Step S105 may be set as, for example, a stop state in which the power conversion operation by the power conversion unit 11 (that is, a switching operation of the switching elements in the power conversion unit 11) is stopped, or may be set as, for example, a standby state in which the power conversion unit 11 executes the inverter operation outputting AC power low enough not to drive the motor 3.

In Step S106, the monitoring unit 15 determines whether or not the power storage amount of the power storage unit 12 has fallen below a previously specified lower limit.

When determining that the power storage amount of the power storage unit 12 has fallen below the lower limit in Step S106, the monitoring unit 15 returns to Step S101, and the respective aforementioned processing steps are executed again. Specifically, in Step S101, the motor drive device 1 enters the state of being electrically connected to the AC power supply 2 and electrically detached from the motor 3, and in Step S102, the control unit 14 performs the control of transmitting a converter operation conversion command to the power conversion unit 11 and causing the power conversion unit 11 to execute the converter operation; and consequently, the power storage unit 12 is charged, and the power storage amount of the power storage unit 12 gradually increases.

When not determining that the power storage amount of the power storage unit 12 has fallen below the lower limit in Step S106, the monitoring unit 15 returns to Step S105, and the control unit 14 performs the control of transmitting an inverter operation conversion command to the power conversion unit 11 and causing the power conversion unit 11 to execute the inverter operation; and consequently, the motor 3 is driven, and the power storage amount of the power storage unit 12 further decreases.

As described above, the present embodiment stores energy from the AC power supply 2 into the power storage unit 12 by causing the power conversion unit 11 to enter the state of being electrically connected to the AC power supply 2 and electrically detached from the motor 3, and causing the power conversion unit 11 to execute the converter operation, and when driving the motor 3, drives the motor 3 solely by energy stored in the power storage unit 12 by causing the power conversion unit 11 to enter the state of being electrically detached from the AC power supply 2 and electrically connected to the motor 3, and causing the power conversion unit 11 to execute the inverter operation. In other words, the present embodiment causes the power conversion unit 11 being a single bridge circuit to execute the converter operation and the inverter operation in a time-sharing manner, and therefore provides a high operating rate of the bridge circuit; and the present embodiment also reduces a number of parts compared with a conventional case of implementing an converter and an inverter in separate circuits (a total of two bridge circuits), and therefore is low-cost and space-saving. Further, when driving the motor 3, the present embodiment electrically detaches the motor drive device 1 from the AC power supply 2 and covers entire electric power required for driving the motor 3 by AC power converted by the inverter from DC power stored in the power storage unit 12, and therefore can further reduce a capacity of a power supply facility on the AC power supply 2 side. Further, according to the present embodiment, AC current flows through the first open-close unit 21 in an on-state in a case of storing DC power into the power storage unit 12, and AC current flows through the second open-close unit 22 in an on-state in a case of driving the motor 3; and since, by causing the power storage unit 12 to store power slowly, the AC current flowing through the first open-close unit 21 in the case of storing power can be made smaller than the AC current flowing through the second open-close unit 22 in the case of driving the motor 3, the first open-close unit 21 can be further downsized compared with the second open-close unit 22, and further cost reduction can be planned.

Next, embodiments driving a multi-winding-type motor and a plurality of single-winding type motors by use of the motor drive device 1 according the present embodiment will be described.

A motor drive system according to a first embodiment includes the motor drive device 1 described with reference to FIGS. 1 to 4, and an inverter.

Figure 5:
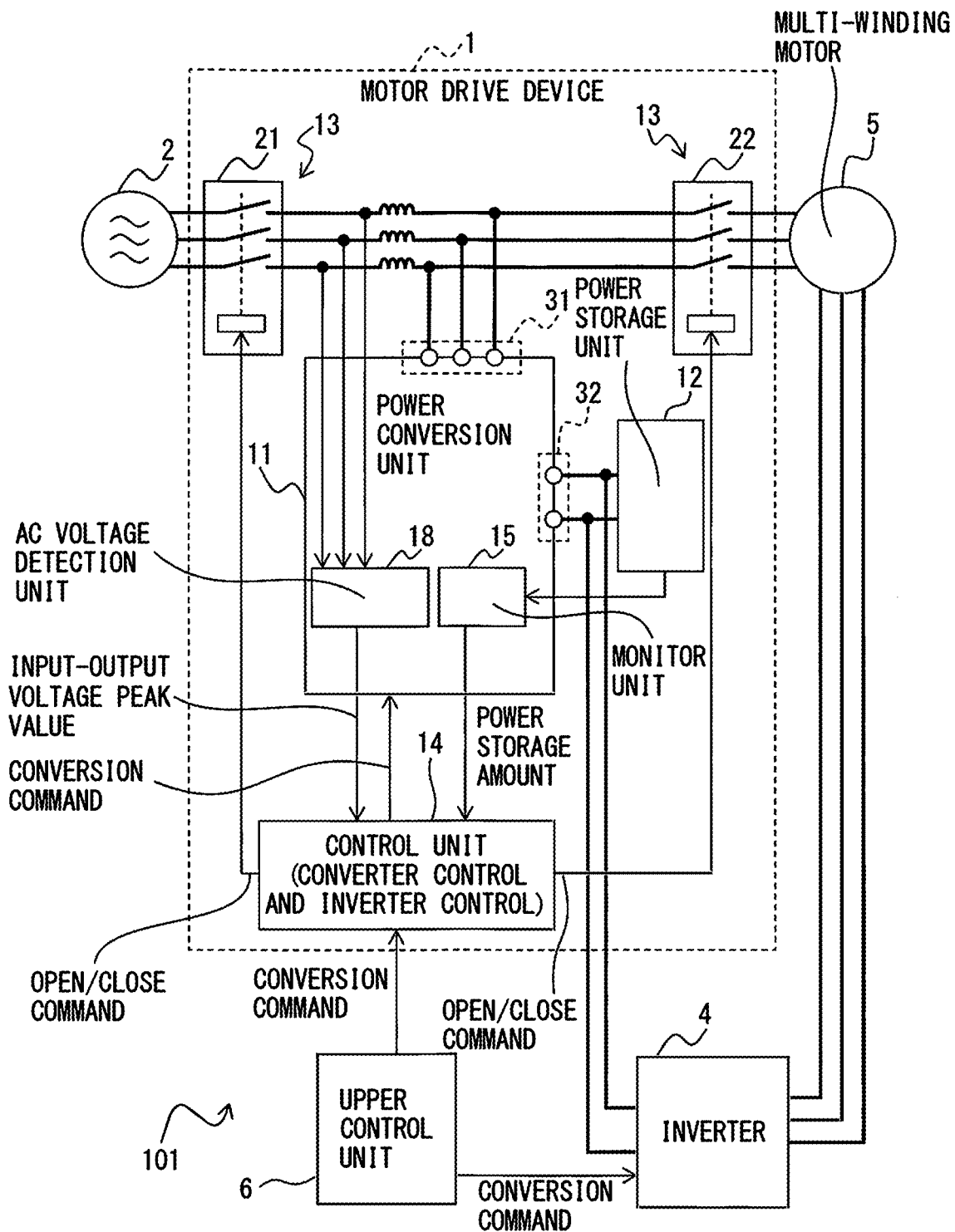
FIG. 5 is a diagram illustrating a motor drive system driving a multi-winding-type motor, according to a first embodiment.
Figure 6:
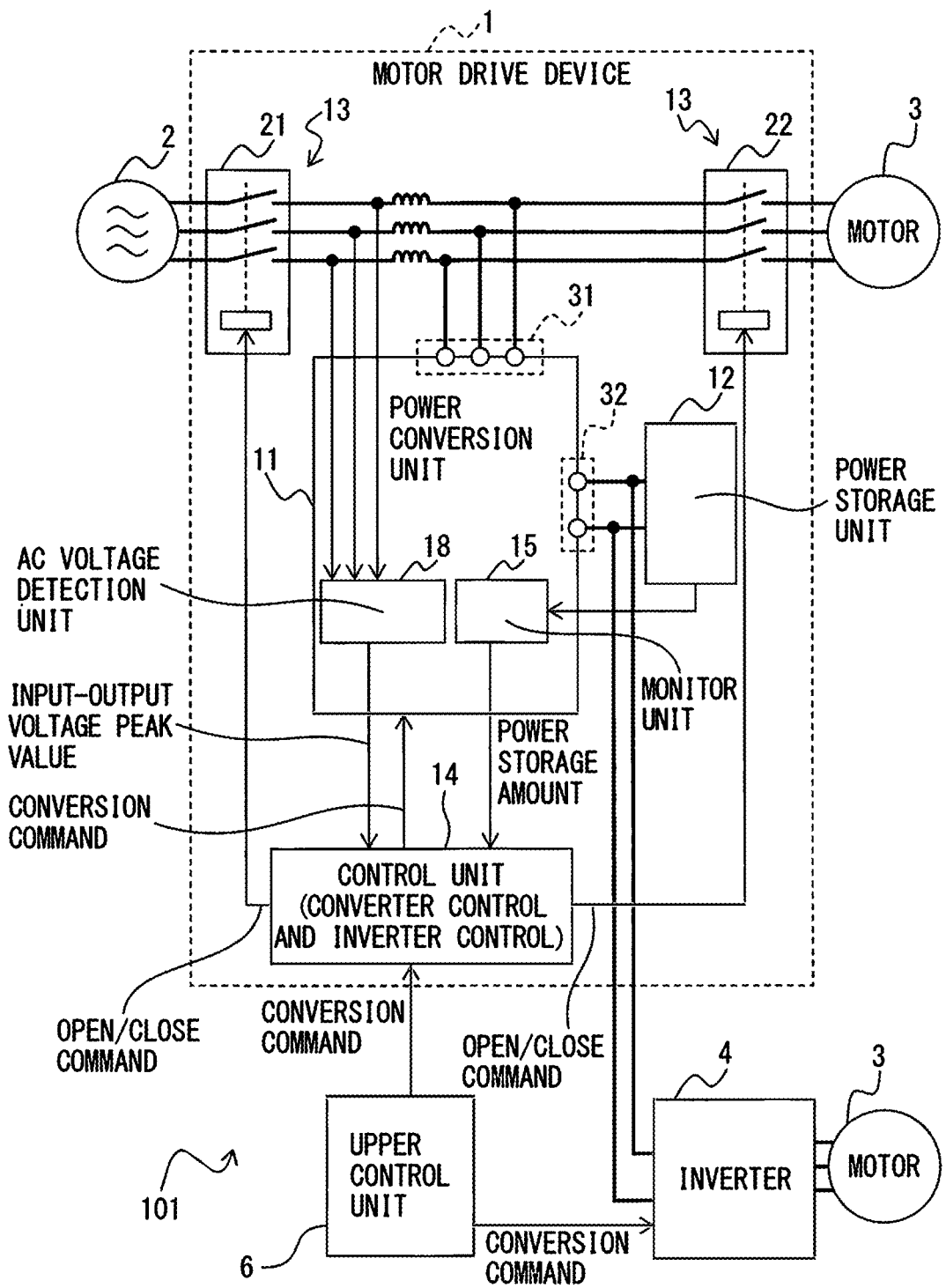
FIG. 6 is a diagram illustrating a motor drive system driving a plurality of motors, according to the first embodiment.

FIG. 5 is a diagram illustrating a motor drive system driving a multi-winding-type motor, according to the first embodiment. Although a case of controlling a double-winding-type motor 5 by a motor drive system 101 according to the first embodiment will be described as an example in FIG. 5, a number of windings of the multi-winding-type motor 5 may be three or more. Further, FIG. 6 is a diagram illustrating the motor drive system driving a plurality of motors, according to the first embodiment. Although a case of controlling two single-winding-type motors 3 by the motor drive system 101 according to the first embodiment will be described as an example in FIG. 6, a number of motors 3 may be three or more.

The motor drive system 101 according to the first embodiment includes the motor drive device 1 described with reference to FIGS. 1 to 4, and an inverter 4 being connected to the power storage unit 12, converting DC power stored in the power storage unit 12 into AC power, and outputting the AC power. The control unit 14 in the motor drive device 1 and the inverter 4 are controlled by a conversion command generated by an upper control unit 6. As described above, the power storage unit 12 is connected to the DC terminal 32 on the power conversion unit 11 in the motor drive device 1, and the DC terminal 32 on the power conversion unit 11 is also connected to a DC terminal side of the inverter 4; and therefore a DC link is configured on the DC terminal 32 side of the power conversion unit 11. The inverter 4 is composed of a bridge circuit including switching elements and diodes connected in antiparallel with the switching elements. Although examples of the switching element include a unipolar transistor such as an FET, a bipolar transistor, an IGBT, a thyristor, and a GTO, the switching element type itself does not limit the present embodiment and may be another type of switching element. The inverter 4 is configured with a three-phase bridge circuit when a connected motor is three-phase and is configured with a single-phase bridge circuit when the connected motor is single-phase. DC power supplied to the inverter 4 is stored in the power storage unit 12. As described above, power storage of the power storage unit 12 is performed by causing the power conversion unit 11 to enter a state of being electrically connected to an AC power supply 2 and electrically detached from the motor, and causing the power conversion unit 11 to execute a converter operation. Electric power required for driving the motor is covered by AC power converted from DC power stored in the power storage unit 12 by the power conversion unit 11 or the inverter 4, and therefore a capacity of a power supply facility on the AC power supply 2 side can be further reduced; and by causing the power storage unit 12 to store power slowly, AC current flowing through the first open-close unit 21 in a case of storing power can be made smaller than AC current flowing through the second open-close unit 22 in a case of driving the motor, and therefore the first open-close unit 21 can be further downsized compared with the second open-close unit 22, and further cost reduction can be planned.

When the motor drive system 101 according to the first embodiment drives a multi-winding-type motor (hereinafter simply referred to as a "multi-winding motor") 5 as illustrated in FIG. 5, inverters 4, a number of the inverters being less than a number of windings of the multi-winding motor 5 by one, are connected to the respective windings. Specifically, one of a plurality of windings of the multi-winding motor 5 is connected to the power conversion unit 11 in the motor drive device 1 through the second open-close unit 22, and the remaining windings are connected to AC terminals on the inverters 4. The inverter 4 converts DC power stored in the power storage unit 12 into AC power and outputs the AC power to a winding different from the winding connected to the power conversion unit 11 in the motor drive device 1, out of the plurality of windings of the multi-winding motor 5. In the example illustrated in FIG. 5, the multi-winding motor 5 is assumed to be a double-winding type, and therefore one winding is connected to the power conversion unit 11 in the motor drive device 1 through the second open-close unit 22, and the other winding is connected to the AC terminal on the inverter 4. The upper control unit 6 controls operations of the control unit 14 in the motor drive device 1 and the inverter 4, respectively, in accordance with an operation program of the multi-winding motor 5. When the multi-winding motor 5 is a three-winding type or higher, one winding is connected to the power conversion unit 11 in the motor drive device 1 through the second open-close unit 22, and the remaining two or more windings are connected to (AC terminals on) inverters 4 correspondingly to the respective windings. Conventionally, in a case of driving a multi-winding motor, one converter and inverters, a number of the inverters being a number of windings of the multi-winding motor, need to be provided. On the other hand, in the motor drive system 101 according to the first embodiment, one motor drive device 1 and inverters 4, a number of the inverters being less than the number of windings of the multi-winding motor 5 by one, have only to be provided; and since the power conversion unit 11 in the motor drive device 1 is composed of one bridge circuit, at least one bridge circuit can be reduced compared with a conventional device, and therefore cost reduction and space saving are achieved.

When the motor drive system 101 according to the first embodiment drives a plurality of motors 3 as illustrated in FIG. 6, inverters 4, a number of the inverters being less than a number of the motors 3 by one, are connected to the respective motors 3. Specifically, one of a plurality of motors 3 is connected to the power conversion unit 11 in the motor drive device 1 through the second open-close unit 22, and the remaining motors 3 are connected to AC terminals on the inverters 4. The inverter 4 converts DC power stored in the power storage unit 12 into AC power and outputs the AC power to a motor 3 different from the motor 3 connected to the power conversion unit 11 in the motor drive device 1. The upper control unit 6 controls operations of the control unit 14 in the motor drive device 1 and the inverters 4, respectively, in accordance with an operation program of the respective motors 3. Conventionally, in a case of driving a plurality of motors, one converter and inverters, a number of the inverters being a number of the motors, need to be provided. On the other hand, in the motor drive system 101 according to the first embodiment, one motor drive device 1 and inverters 4, a number of the inverters being less than the number of the motors 3 by one, have only to be provided; and since the power conversion unit 11 in the motor drive device 1 is composed of one bridge circuit, at least one bridge circuit can be reduced compared with a conventional device, and therefore cost reduction and space saving are achieved.

The case of driving a multi-winding motor 5 in FIG. 5 and the case of driving a plurality of motors 3 in FIG. 6 have been described with regard to the motor drive system 101 according to the first embodiment, whereas the system is similarly applicable to a case of driving "a plurality of" multi-winding motors 5. In this case, in the motor drive system 101 according to the first embodiment, one motor drive device 1 and inverters 4, a number of the inverters being less than a total number of windings of the plurality of multi-winding motors 5 by one, has only to be provided.

A motor drive system according to a second embodiment includes a plurality of the motor drive devices 1 described with reference to FIGS. 1 to 4.

Figure 7:
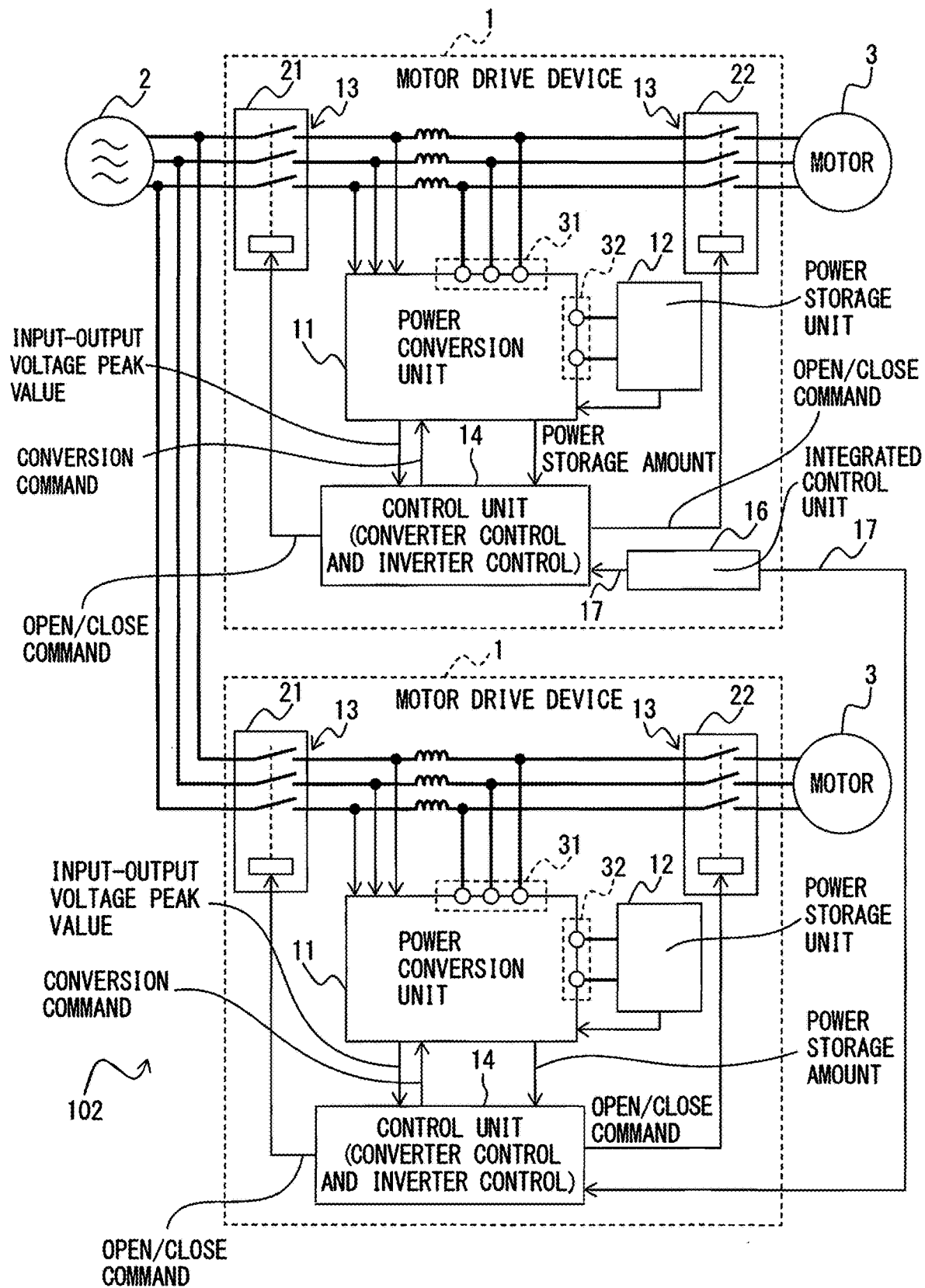
FIG. 7 is a diagram illustrating a motor drive system driving a plurality of motors, according to a second embodiment, and particularly illustrates a case of an integrated control unit being provided in one of motor drive devices.
Figure 8:
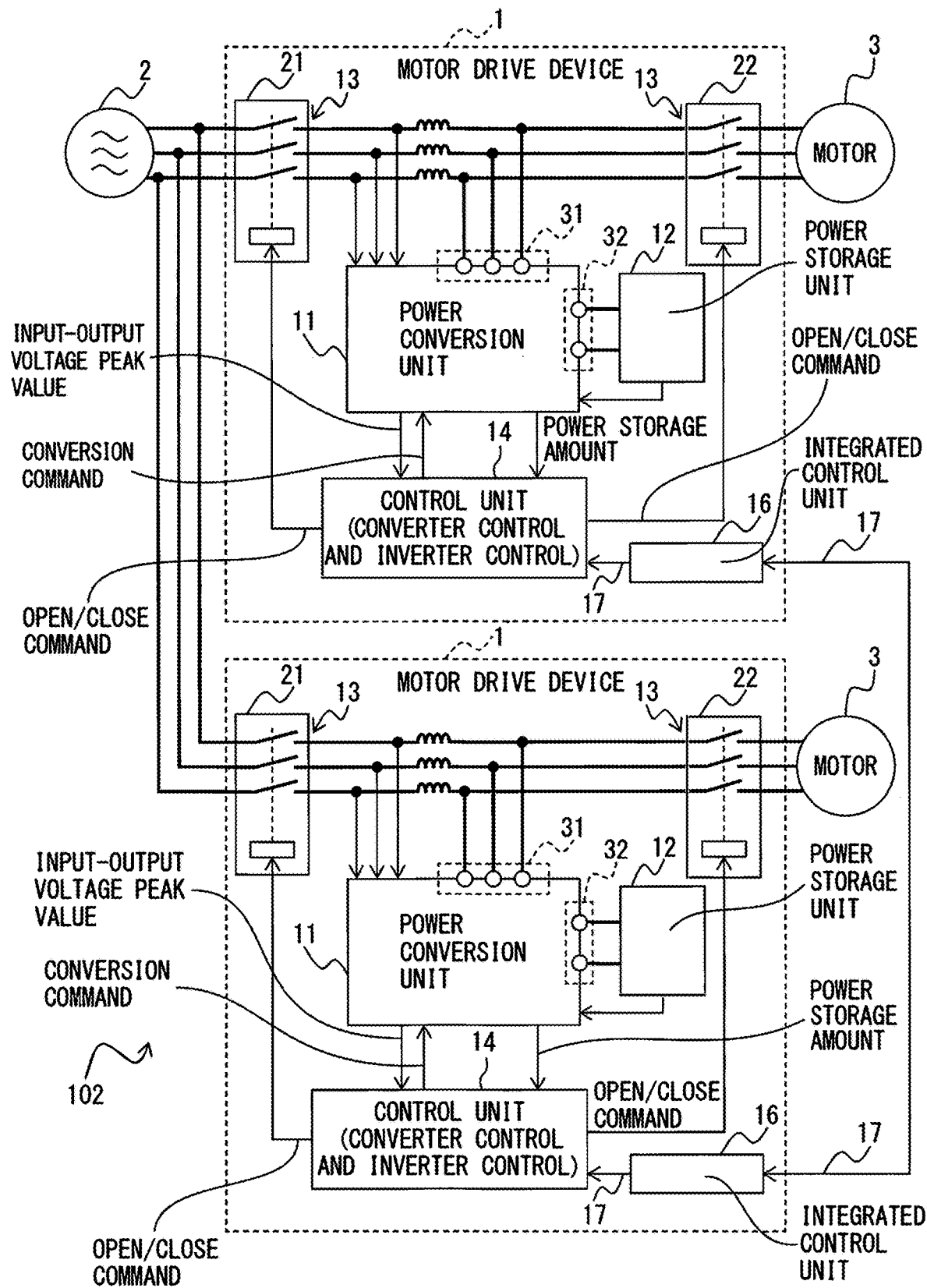
FIG. 8 is a diagram illustrating the motor drive system driving a plurality of motors, according to the second embodiment, and particularly illustrates a case of the integrated control units being provided in a plurality of the motor drive devices.
Figure 9:
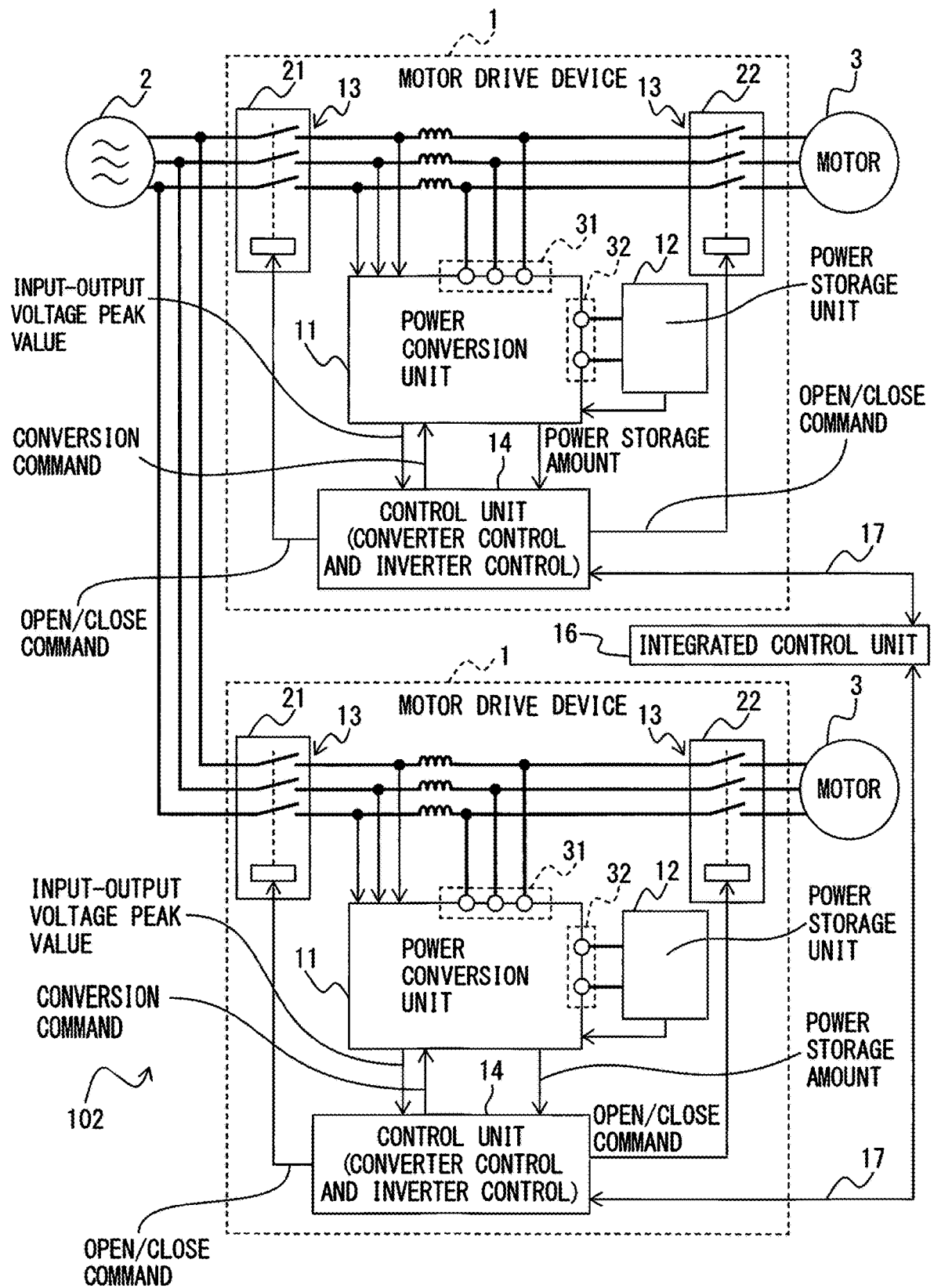
FIG. 9 is a diagram illustrating the motor drive system driving a plurality of motors, according to the second embodiment, and particularly illustrates a case of the integrated control unit being provided outside the motor drive devices.

FIG. 7 is a diagram illustrating the motor drive system driving a plurality of motors 3, according to the second embodiment, and particularly illustrates a case of an integrated control unit 16 being provided in one of the motor drive devices 1. FIG. 8 is a diagram illustrating the motor drive system driving a plurality of motors 3, according to the second embodiment, and particularly illustrates a case of the integrated control units 16 being provided in a plurality of the motor drive devices 1. Further, FIG. 9 is a diagram illustrating the motor drive system driving a plurality of motors 3, according to the second embodiment, and particularly illustrates a case of the integrated control unit 16 provided outside the motor drive devices 1.

A motor drive system 102 according to the second embodiment includes a plurality of the motor drive devices 1 described with reference to FIGS. 1 to 4 and an integrated control unit 16. Each motor drive device 1 and the integrated control unit 16 are communicably connected through a communication unit 17. The connection through the communication unit 17 may be either wired or wireless. The integrated control unit 16 controls an operation of the control unit 14 in each motor drive device 1 through the communication unit 17. The following is a more detailed description.

The integrated control unit 16 controls an operation of the control unit 14 in each motor drive device 1 in such a way that control of causing the switching unit 13 to electrically connect the AC terminal 31 on the power conversion unit 11 to the AC power supply 2, and causing the power conversion unit 11 to execute a converter operation is not executed between the respective motor drive devices 1 in a temporally overlapping manner. Specifically, the integrated control unit 16 controls the operation of the control unit 14 in each motor drive device 1 in such a way that transmission timings of a close command to the first open-close unit 21, an open command to the second open-close unit 22, and a converter operation conversion command to the power conversion unit 11 for storing DC power into the power storage unit 12 are different between the respective motor drive devices 1. Through the control of the operation of the control unit 14 in each motor drive device 1 by the integrated control unit 16, the converter operation by the power conversion unit 11 in a state of the AC terminal 31 on the power conversion unit 11 being electrically connected to the AC power supply 2 is executed by the respective motor drive devices 1, the executions being shifted from one another in time.

For example, the integrated control unit 16 is provided in at least one of a plurality of the motor drive devices 1. Examples of a communication system in the communication unit 17 between the respective motor drive devices 1 include, for example, a master-slave system (FIG. 7) and a token passing system (FIG. 8).

When the communication system in the communication unit 17 is determined to be the master-slave system, the integrated control unit 16 is provided in one of a plurality of the motor drive devices 1 as illustrated in FIG. 7. The motor drive device 1 provided with the integrated control unit 16 becomes a master, and a motor drive device 1 not provided with the integrated control unit 16 becomes a slave. While the power conversion unit 11 is electrically connected to the AC power supply 2 and the converter operation is executed by the power conversion unit 11 in the master motor drive device 1, the integrated control unit 16 in the master motor drive device 1 controls the control unit 14 in the slave motor drive device 1 in such a way that the power conversion unit 11 is not electrically connected to the AC power supply 2 and the converter operation is not executed by the power conversion unit 11. While the power conversion unit 11 is electrically connected to the motor 3 and the inverter operation is executed by the power conversion unit 11 in the master motor drive device 1, the integrated control unit 16 in the master motor drive device 1 permits the control unit 14 in the slave motor drive device 1 (the control unit 14 in one slave motor drive device 1 when a plurality of slave motor drive devices 1 exist) to electrically connect the power conversion unit 11 to the AC power supply 2 and execute the converter operation by the power conversion unit 11. Consequently, the converter operation by the power conversion unit 11 in a state of the power conversion unit 11 being electrically connected to the AC power supply 2 is executed by the respective motor drive devices 1, the executions being shifted from one another in time.

When the communication system in the communication unit 17 is determined to be the token passing system, the integrated control units 16 are provided in a plurality of the motor drive devices 1 as illustrated in FIG. 8. The integrated control unit 16 in each motor drive device 1 is connected to the control unit 14 and controls a series of the aforementioned processing steps by the control unit 14. The integrated control unit 16 may be implemented in such a way as to be included in the control unit 14. The integrated control unit 16 provided in a motor drive device 1 exchanges a token with the integrated control unit 16 provided in another motor drive device 1 through the communication unit 17. A motor drive device 1 including an integrated control unit 16 receiving the token electrically connects the power conversion unit 11 to the AC power supply 2 and executes the converter operation by the power conversion unit 11; and a motor drive device 1 including an integrated control unit 16 without the token does not execute electrical connection of the power conversion unit 11 to the AC power supply 2 and the converter operation by the power conversion unit 11, electrically connects the power conversion unit 11 to the motor 3, and executes the inverter operation by the power conversion unit 11. Consequently, the converter operation by the power conversion unit 11 in a state of the power conversion unit 11 being electrically connected to the AC power supply 2 is executed by the respective motor drive devices 1, the executions being shifted from one another in time.

Further, for example, as illustrated in FIG. 9, the integrated control unit 16 may be provided outside the motor drive devices 1 and may be provided as a higher-level control device over the respective motor drive devices 1.

As described above, in the motor drive system 102 according to the second embodiment illustrated in FIGS. 7 to 9, power storage of the power storage unit 12 in each motor drive device 1 is performed by causing the power conversion unit 11 to execute the converter operation in a state of the motor drive device 1 being electrically detached from the motor 3. Since electric power required for driving a plurality of motors 3 is covered by AC power converted by the power conversion unit 11 from DC power stored in the power storage unit 12 in each motor drive device 1, a capacity of a power supply facility on the AC power supply 2 side can be further reduced; and since, by causing the power storage unit 12 to store power slowly, AC current flowing through the first open-close unit 21 in a case of storing power can be made smaller than AC current flowing through the second open-close unit 22 in a case of driving the motor 3, the first open-close unit 21 can be further downsized compared with the second open-close unit 22, and therefore further cost reduction can be planned.

Next, a specific operation example of the motor drive system driving two motors, according to the second embodiment, will be described. In the following description, two motor drive devices in the motor drive system according to the second embodiment are referred to as a first motor drive device and a second motor drive device, respectively.

FIG. 10A is a diagram illustrating exemplary waveforms at respective parts in each motor drive device in a case of driving two motors in the motor drive system according to the second embodiment, and particularly illustrates exemplary waveforms at respective parts in the first motor drive device. FIG. 10B is a diagram illustrating exemplary waveforms at respective parts in each motor drive device in a case of driving two motors in the motor drive system according to the second embodiment, and particularly illustrates exemplary waveforms at respective parts in the second motor drive device. In FIGS. 10A and 10B, motor output, power supply current, power storage unit current, power storage unit voltage, a connection state between the AC power supply and the power conversion unit, and a connection state between the motor and the power conversion unit are illustrated in this order from the top as the waveforms at the respective parts. The illustrated waveforms at the respective parts are strictly examples.

In the second motor drive device in a period between times $t_0$ and $t_1$, the AC power supply is connected to the power conversion unit, the power conversion unit performs the converter operation, and the power storage unit is charged, as illustrated in FIG. 10B. On the other hand, in the first motor drive device, the AC power supply is electrically detached from the power conversion unit, and the power conversion unit performs neither the converter operation nor the inverter operation, as illustrated in FIG. 10A.

At the time $t_1$, charging of the power storage unit in the second motor drive device is completed, and the AC power supply is electrically detached from the power conversion unit.

In the second motor drive device at a time $t_2$, the motor is connected to the power conversion unit, the power conversion unit performs the inverter operation, and the motor is driven, as illustrated in FIG. 10B. On the other hand, in the first motor drive device, the AC power supply is connected to the power conversion unit, the power conversion unit performs the converter operation, and the power storage unit is charged, as illustrated in FIG. 10A.

In the first motor drive device at a time $t_3$, power storage of the power storage unit is completed, and the AC power supply is electrically detached from the power conversion unit, as illustrated in FIG. 10A.

Thus, since a power storage period of the power storage unit in the second motor drive device is between the times $t_0$ and $t_1$, and a power storage period of the power storage unit in the first motor drive device is between the times $t_2$ and $t_3$, there is no overlap in time between the first motor drive device and the second motor drive device in terms of the converter operation by the power conversion unit in a state of the power conversion unit being electrically connected to the AC power supply.

When the monitoring unit determines that a power storage amount (storage power voltage) of the power storage unit has fallen below a lower limit in the second motor drive device at a time $t_4$, the motor is electrically detached from the power conversion unit at a time $t_5$, the AC power supply is connected to the power conversion unit and the power conversion unit performs the converter operation at a time $t_6$, and the power storage unit is charged, as illustrated in FIG. 10B. On the other hand, in the first motor drive device, the power conversion unit is electrically detached from the AC power supply and is connected to the motor in a period between times $t_4$ and $t_7$, the power conversion unit performs the inverter operation, and the motor is driven, as illustrated in FIG. 10A. Accordingly, during a power storage period of the power storage unit in the second motor drive device between the times $t_6$ and $t_7$, the power conversion unit in the first motor drive device is electrically detached from the AC power supply and is connected to the motor, and the power conversion unit performs the inverter operation; and therefore there is no overlap in time between the first motor drive device and the second motor drive device in terms of the converter operation by the power conversion unit in a state of the power conversion unit being electrically connected to the AC power supply.

Similarly, in the first motor drive device in a period between times $t_8$ to $t_9$, the AC power supply is connected to the power conversion unit, the power conversion unit performs the converter operation, and the power storage unit is charged, as illustrated in FIG. 10A. On the other hand, in the second motor drive device, the power conversion unit is electrically detached from the AC power supply, as illustrated in FIG. 10B, and therefore there is no overlap in time between the first motor drive device and the second motor drive device in terms of the converter operation by the power conversion unit in a state of the power conversion unit being electrically connected to the AC power supply.

FIG. 11A is a diagram illustrating exemplary waveforms at respective parts in each motor drive device in a case of driving two motors in two conventional motor drive devices, and particularly illustrates exemplary waveforms at respective parts in a first motor drive device. FIG. 11B is a diagram illustrating exemplary waveforms at respective parts in each motor drive device in a case of driving two motors in the two conventional motor drive devices, and particularly illustrates exemplary waveforms at respective parts in a second motor drive device. In FIGS. 11A and 11B, motor output, power supply current, power storage unit current, power storage unit voltage, a connection state between an AC power supply and a converter, a connection state between the motor and a power conversion unit are illustrated in this order from the top as the waveforms at the respective parts. The illustrated waveforms at the respective parts are strictly examples. In both the first motor drive device and the second motor drive device in a period between times $t_0$ and $t_1$, the AC power supply is connected to the converter, and the power storage unit is charged, as illustrated in FIGS. 11A and 11B, and therefore a power supply capacity needs to be increased compared with the present embodiment.

For example, the aforementioned control unit 14, monitoring unit 15, integrated control unit 16, and upper control unit 6 may be built in a form of a software program or may be built by a combination of various types of electronic circuits and a software program. In this case, for example, a function of each unit may be implemented by causing an arithmetic processing unit such as an MPU or a DSP to operate the software program. Alternatively, the functions of the control unit 14, the monitoring unit 15, the integrated control unit 16, and the upper control unit 6 may be implemented as a semiconductor integrated circuit on which a software program providing the functions is written.

One aspect of the present disclosure can implement a small-sized and low-cost motor drive device including a power storage unit provided for reducing a power peak of an AC power supply, and a motor drive system.

The invention claimed is:

1. A motor drive device, comprising:
 a power conversion unit including an AC terminal and a DC terminal, and configured to selectively execute
  a converter operation of converting AC power input through the AC terminal into DC power and outputting the DC power through the DC terminal, and
  an inverter operation of converting DC power input through the DC terminal into AC power for motor driving and outputting the AC power through the AC terminal;
 a power storage unit electrically connected through the DC terminal on the power conversion unit, and configured to store DC power output from the power conversion unit and also supply DC power to the power conversion unit;
 a switching unit configured to switch an electric connection destination of the AC terminal on the power conversion unit between an AC power supply and a motor; and
 a control unit
  configured to control the switching unit to have the AC terminal on the power conversion unit electrically connected to the AC power supply and also control the power conversion unit to have the converter operation executed to store DC power into the power storage unit, and
  configured to control the switching unit to have the AC terminal on the power conversion unit electrically connected to the motor and also control the power conversion unit to have the inverter operation executed to drive the motor,
 wherein
 the switching unit includes
  a first open-close unit configured to open and close an electric circuit between the AC terminal on the power conversion unit and the AC power supply, and
  a second open-close unit configured to open and close an electric circuit between the AC terminal on the power conversion unit and the motor, and
 the control unit is configured to
  transmit to the switching unit an open/close command to close a contact point on the first open-close unit and open a contact point on the second open-close unit when storing DC power into the power storage unit, and transmit to the switching unit an open/close command to open the contact point on the first open-close unit and close the contact point on the second open-close unit when driving the motor.

2. The motor drive device according to claim 1, further comprising a monitoring unit configured to monitor a power storage amount of the power storage unit.

3. The motor drive device according to claim 2, wherein, when charging the power storage unit, the control unit is configured to perform control of causing the switching unit to electrically connect the AC terminal on the power conversion unit to the AC power supply and also causing the power conversion unit to execute the converter operation, until the monitoring unit determines that the power storage amount of the power storage unit has reached a previously specified upper limit.

4. The motor drive device according to claim 3, wherein, when the monitoring unit determines that the power storage amount of the power storage unit has reached the upper limit due to storage of DC power into the power storage unit, the control unit is configured to perform control of causing the switching unit to electrically connect the AC terminal on the power conversion unit to the motor and also causing the power conversion unit to execute the inverter operation.

5. The motor drive device according to claim 4, wherein, when the monitoring unit determines that the power storage amount of the power storage unit has fallen below a previously specified lower limit due to driving the motor, the control unit is configured to perform control of causing the switching unit to electrically connect the AC terminal on the power conversion unit to the AC power supply and also causing the power conversion unit to execute the converter operation.

6. A motor drive system, comprising:
a motor drive device; and
an inverter,
wherein
the motor drive device includes:
a power conversion unit including an AC terminal and a DC terminal, and configured to selectively execute
a converter operation of converting AC power input through the AC terminal into DC power and outputting the DC power through the DC terminal, and
an inverter operation of converting DC power input through the DC terminal into AC power for motor driving and outputting the AC power through the AC terminal;
a power storage unit electrically connected through the DC terminal on the power conversion unit, and configured to store DC power output from the power conversion unit and also supply DC power to the power conversion unit;
a switching unit configured to switch an electric connection destination of the AC terminal on the power conversion unit between an AC power supply and a motor; and
a control unit
configured to control the switching unit to have the AC terminal on the power conversion unit electrically connected to the AC power supply and also control the power conversion unit to have the converter operation executed to store DC power into the power storage unit, and
configured to control the switching unit to have the AC terminal on the power conversion unit electrically connected to the motor and also control the power conversion unit to have the inverter operation executed to drive the motor,
the switching unit includes
a first open-close unit configured to open and close an electric circuit between the AC terminal on the power conversion unit and the AC power supply, and
a second open-close unit configured to open and close an electric circuit between the AC terminal on the power conversion unit and the motor,
the control unit is configured to
transmit to the switching unit an open/close command to close a contact point on the first open-close unit and open a contact point on the second open-close unit when storing DC power into the power storage unit, and
transmit to the switching unit an open/close command to open the contact point on the first open-close unit and close the contact point on the second open-close unit when driving the motor, and
the inverter is connected to the power storage unit, and configured to convert DC power stored in the power storage unit into AC power and output the AC power.

7. The motor drive system according to claim 6, wherein the motor is a multi-winding-type motor, and
the inverter is configured to convert DC power stored in the power storage unit into AC power and output the AC power to a winding different from a winding connected to the power conversion unit in the motor drive device, out of a plurality of windings of the multi-winding-type motor.

8. The motor drive system according to claim 6, wherein the inverter is configured to convert DC power stored in the power storage unit into AC power for driving a motor different from the motor connected to the power conversion unit in the motor drive device and output the AC power.

9. A motor drive system, comprising:
a plurality of motor drive devices; and
an integrated control unit,
wherein
each of the plurality of motor drive devices includes
a power conversion unit including an AC terminal and a DC terminal, and configured to selectively execute
a converter operation of converting AC power input through the AC terminal into DC power and outputting the DC power through the DC terminal, and
an inverter operation of converting DC power input through the DC terminal into AC power for motor driving and outputting the AC power through the AC terminal;
a power storage unit electrically connected through the DC terminal on the power conversion unit, and configured to store DC power output from the power conversion unit and also supply DC power to the power conversion unit;
a switching unit configured to switch an electric connection destination of the AC terminal on the power conversion unit between an AC power supply and a motor; and
a control unit
configured to control the switching unit to have the AC terminal on the power conversion unit electrically connected to the AC power supply and also control the power conversion unit to have the converter operation executed to store DC power into the power storage unit, and configured to control the switching unit to have the AC terminal on the power conversion unit electrically connected to the motor and also control the power conversion unit to have the inverter operation executed to drive the motor, and the integrated control unit is configured to control an operation of the control unit in each of the motor drive devices in such a way that control of causing the switching unit to electrically connect the AC terminal on the power conversion unit to the AC power supply and also causing the power conversion unit to execute the converter operation is not executed between the respective motor drive devices in a temporally overlapping manner.

10. The motor drive system according to claim 9, further comprising a communication unit configured to communicably connect the plurality of the motor drive devices to the integrated control unit, wherein the integrated control unit is configured to control an operation of the control unit in each of the motor drive devices through the communication unit.

11. The motor drive system according to claim 10, wherein the integrated control unit is provided in at least one of the plurality of the motor drive devices.

12. The motor drive system according to claim 9, wherein, in each of the plurality of motor drive devices, the switching unit includes
 a first open-close unit configured to open and close an electric circuit between the AC terminal on the power conversion unit and the AC power supply, and
 a second open-close unit configured to open and close an electric circuit between the AC terminal on the power conversion unit and the motor, and the control unit is configured to
 transmit to the switching unit an open/close command to close a contact point on the first open-close unit and open a contact point on the second open-close unit when storing DC power into the power storage unit, and
 transmit to the switching unit an open/close command to open the contact point on the first open-close unit and close the contact point on the second open-close unit when driving the motor.

* * * * *